United States Patent
Ide et al.

(10) Patent No.: US 7,163,368 B2
(45) Date of Patent: Jan. 16, 2007

(54) HYDRODYNAMIC BEARING RUNNER FOR USE IN TILTING PAD THRUST BEARING ASSEMBLIES FOR ELECTRIC SUBMERSIBLE PUMPS

(76) Inventors: Russell Charles Ide, 793 Victory Hwy., West Greenwich, RI (US) 02817; Russell Douglas Ide, P.O. Box 878, Charlestown, RI (US) 02813

( * ) Notice: Subject to any disclaimer, the term of this patent is extended or adjusted under 35 U.S.C. 154(b) by 380 days.

(21) Appl. No.: 10/786,127

(22) Filed: Feb. 26, 2004

(65) Prior Publication Data

US 2004/0241021 A1    Dec. 2, 2004

Related U.S. Application Data

(60) Provisional application No. 60/480,744, filed on Jun. 24, 2003, provisional application No. 60/474,298, filed on May 30, 2003.

(51) Int. Cl.
    *F04D 29/057* (2006.01)
(52) U.S. Cl. ............ 415/104; 415/229; 384/105; 384/625; 384/907
(58) Field of Classification Search ........... 415/104, 415/107, 229; 384/907, 625, 590, 420, 123, 384/105, 112; 29/888.021, 888.024
    See application file for complete search history.

(56) References Cited

U.S. PATENT DOCUMENTS

| | | | |
|---|---|---|---|
| 3,567,504 A * | 3/1971 | Hopkins et al. | 428/320.2 |
| 4,208,472 A | 6/1980 | Cho et al. | 428/550 |
| 4,676,668 A | 6/1987 | Ide | 384/117 |
| 5,125,754 A | 6/1992 | Ide | 384/122 |
| 5,137,373 A | 8/1992 | Ide | 384/117 |
| 5,509,738 A * | 4/1996 | Haynes et al. | 384/275 |
| 5,718,516 A * | 2/1998 | Cheever et al. | 384/114 |
| 6,017,184 A * | 1/2000 | Aguilar et al. | 415/112 |
| 7,001,077 B1 * | 2/2006 | Gorlach | 384/492 |

OTHER PUBLICATIONS

International Search Report Dated Jun. 20, 2006.

* cited by examiner

*Primary Examiner*—Ninh H. Nguyen
(74) *Attorney, Agent, or Firm*—Michael Bednarek; Paul, Hastings, Janofsky & Walker LLP

(57) ABSTRACT

An electrical submersible pump runner having a core layer and a wear layer affixed to the core layer. One embodiment of the invention provides an electrical submersible pump that includes a motor section and a centrifugal pump section. A seal section and rotary gas separator may also be included. The pump is powered by an electric cable that connects the pump, located in a bore hole, to a power source on the surface. A thrust runner coated with a wear layer (e.g., polymer) is provided in the motor and/or seal section to reduce bearing temperature, provide longer bearing life, reduce costs, and facilitate overhaul. The runner may also function as a rotating up-thrust bearing when the runner is coated with a wear layer on one side that is formed with a bearing geometry. In this case, the up-thrust bearing may be eliminated.

33 Claims, 5 Drawing Sheets

HYDRODYNAMIC BEARING RUNNER FOR USE IN TILTING PAD THRUST BEARING ASSEMBLIES FOR ELECTRIC SUBMERSIBLE PUMPS

This application claims the benefit of U.S. Provisional Application Ser. No. 60/474,298, filed May 30, 2003, and U.S. Provisional Application Ser. No. 60/480,744, filed Jun. 24, 2003, which are both incorporated herein by reference in their entirety.

BACKGROUND

1. Field of the Invention

This invention relates to electrical submersible pumps, and more particularly to electrical submersible pumps that are powered by an electrical cable and have hydrodynamic (fluid film) thrust bearings in their motor section and in their seal section when employed.

2. Background of the Invention

Electric submersible pumps are used to lift liquids such as oil, water, or brine. They are typically long relative to their diameter to fit down drilled holes. For deep wells, a typical pump system consists of a multi-stage centrifugal pump, rotary gas separator, seal section, and motor. The motor is connected to an electric power source at the surface via electric cables. The rotor in the electric motor incorporates a tilting-pad hydrodynamic (fluid film) thrust bearing to support the rotor weight. The seal section prevents external well fluids from entering the motor and equalizes the pressure between the well fluid and internal motor lubrication oil. The seal section also houses up and down hydrodynamic tilting pad thrust bearings to react loads developed by the centrifugal pump.

For shallow wells such as those used to pump water from drilled holes for potable water, the seal and gas separator sections are eliminated. Tilting pad bearings are still used in the motor section.

For both deep and shallow well pumps, it is industry practice to manufacture the bearing pads of a relatively soft material and run them against a harder runner.

FIG. 5 illustrates the seal section portion of a known deep well submersible pumping system, produced by Baker Hughes of Houston, Tex. under the name Centrilift™. As shown, this seal section of the submersible pumping system includes a runner 550 between a down-thrust bearing 552 and an up-thrust bearing 554.

Tilting pad type hydrodynamic thrust bearings are also known from the present inventor's previous U.S. Pat. No. 4,676,668 to Ide, U.S. Pat. No. 5,137,373 to Ide, and U.S. Pat. No. 5,125,754 also to Ide, which are incorporated herein by reference in their entirety. In U.S. Pat. No. 5,137,373, the bearing can be formed in a single piece; in the other two patents, individual bearing pads are supported in a separate carrier.

In the context of a hydrodynamic thrust bearing, the stationary bearing pads face a rotating "runner" that is secured to (e.g., as by a key) or integrally formed with a shaft, in the presence of a lubricant (typically oil, but also water or a "process fluid"), which effectively separates the two components of the system via an elevated pressure developed at the interface as a result of hydrodynamic effects. For electric submersible pump seal sections, the direction of loading may be in two opposite directions. Hydrodynamic bearings are therefore spaced on both sides of the rotating runner.

In the prior art bearing/runner assemblies described in the aforementioned patents, the pads and runners are fabricated from dissimilar materials to preclude galling should the two components come into contact while under load (particularly at start-up, but also during overload conditions while running). In practice, the pads are, for example, either monolithic bronze, carbon, or fabricated from steel coated with a relatively "soft" non-ferrous material on the running surface, while the runners are typically hardened steel. Among the coatings used are engineered plastics. Industry practice is to apply the various coatings to the bearing pads.

SUMMARY OF THE INVENTION

In accordance with the present invention and contrary to the industry practice of applying the various coatings to the bearing pads, the present inventor has discovered that, in the case of engineered plastic coatings, commercial and performance advantages result from applying the coating to the runner rather than the pads. The pads are preferably uncoated hardened steel. The unexpected advantages resulting from the construction of the present invention include:

- Only one component (i.e., the runner) of the bearing/runner assembly is coated, rather than coating multiple components (i.e., the pads, of which there are typically 5 to 10 per assembly); this results in lower cost (including lower waste of plastic in the molding process).
- The swept area of wear surface (i.e., plastic) is larger with the runner coated and thus the wear rate under mixed/boundary lubrication conditions is reduced, increasing bearing/runner longevity.
- The swept area of wear surface (i.e., plastic) is larger with the runner coated and thus the surface temperature under mixed/boundary lubrication conditions is reduced, increasing bearing/runner longevity.
- The bearing pads, when made of hardened steel, eliminate pad wear. The less costly runner becomes the sacrificial component. Since only the runner may need replacement, overhauls are less complex and costly.
- Recoating individual pads is not practical or economical; recoating a runner is both economical and readily accomplished.
- Conventional uncoated runners may be re-ground/re-lapped if the design thickness tolerance permits, but plastic-coated runners may be reworked indefinitely since only the worn plastic/bronze interlayer is removed and replaced (the steel substrate remains intact in the process).
- The coating on one or both sides of the runner may be applied to form a hydrodynamic bearing pad that rotates with the runner. In this case, the rotating runner actually becomes the bearing and the stationary "bearing" can be replaced by a simple flat plate. In submersible pumps, this can provide a significant advantage. In the pump bearing arrangement, the lower bearing normally reacts operating loads while the upper bearing reacts transient startup up-thrust loads only. By incorporating bearing pads on the runner, the up-thrust bearing can be eliminated.

Thus, an embodiment of the present invention provides an electrical submersible pump shaft and bearing combination including a generally cylindrical shaft having a runner formed or secured thereon. In accordance with an important aspect of the invention, the runner that is supported by the bearing pads is provided with a surface layer of engineered plastic such as polyimide or other polymer coatings. As used herein, an engineered plastic refers to a plastic (e.g., polymer) having high performance characteristics such as high strength, high temperature capability, chemical resistance, and heat resistance. The plastic is engineered to provide the properties required for a particular application. Additional materials can also be added to provide other material characteristics, such as adding Teflon™ and/or graphite to reduce coefficients of friction. Examples of engineered plastics include polyimide, PEEK, nylon, PTFE, and polyamidimide. Naturally, other materials may be used, provided that the chosen material has the required support and wear characteristics. In the currently preferred embodiment, an engineered plastic layer such as polyimide is provided on a sintered bronze layer.

Applying the bronze layer and the polyimide layer to the runner yields advantages similar to those achieved in prior art bearing/runner assemblies in which engineered plastic coatings are applied to the bearing pads. In particular, the plastic layer provides a wear surface so as to avoid damage to the pad during start-up. The wear surface allows the pad to withstand wear caused during start-up. By providing a wear surface, the bearing assembly operates in two modes. First, at initial start-up, the bearing assembly acts as a wear bearing wherein the coated runner shaft rubs against the pad surface. After start-up, the bearing assembly operates hydrodynamically and there is little or no contact between the shaft and bearing pad surface.

Importantly, however, applying the bronze layer and the polyimide layer to the runner yields advantages beyond those of prior art bearing/runner assemblies in which engineered plastic coatings are applied to the bearing pads. To begin with, coating a runner is cheaper than coating bearing pads. In addition, the bearing pads may be constructed of hardened steel, which in turn prolongs their life. Thus, the more expensive component of the bearing/runner system is constructed with the longest life and the cheaper item of the two is constructed as a replaceable wear item. Also, the runner is a much simpler component (e.g., a disc), thus allowing for fairly simple retrofitting to existing systems. Normally, runners are manufactured of heat-treated and often expensive materials. By using such a polymer coating, the runner itself may be manufactured of less expensive, and more easily machined mild steel.

Another advantage of the present invention is that the steel substrate can conduct heat away from the polymer (considered an insulator) better than a conventional polymer-coated bearing pad due to the greater surface area of the runner in comparison with the surface area of the bearing pad(s). Also, by coating the runner, there is more polymer surface area to wear than if the pads themselves are coated. This may extend the bearing/runner life when mixed lubrication occurs. For the case where the coating forms a hydrodynamic bearing pad on the runner surface, one of the pump bearings can be eliminated.

DETAILED DESCRIPTION OF THE INVENTION

Embodiments of thrust bearing runners are described in this detailed description of the invention. In this detailed description, for purposes of explanation, numerous specific details are set forth to provide a thorough understanding of embodiments of the present invention. One skilled in the art will appreciate, however, that embodiments of the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of embodiments of the present invention.

Figure 1:
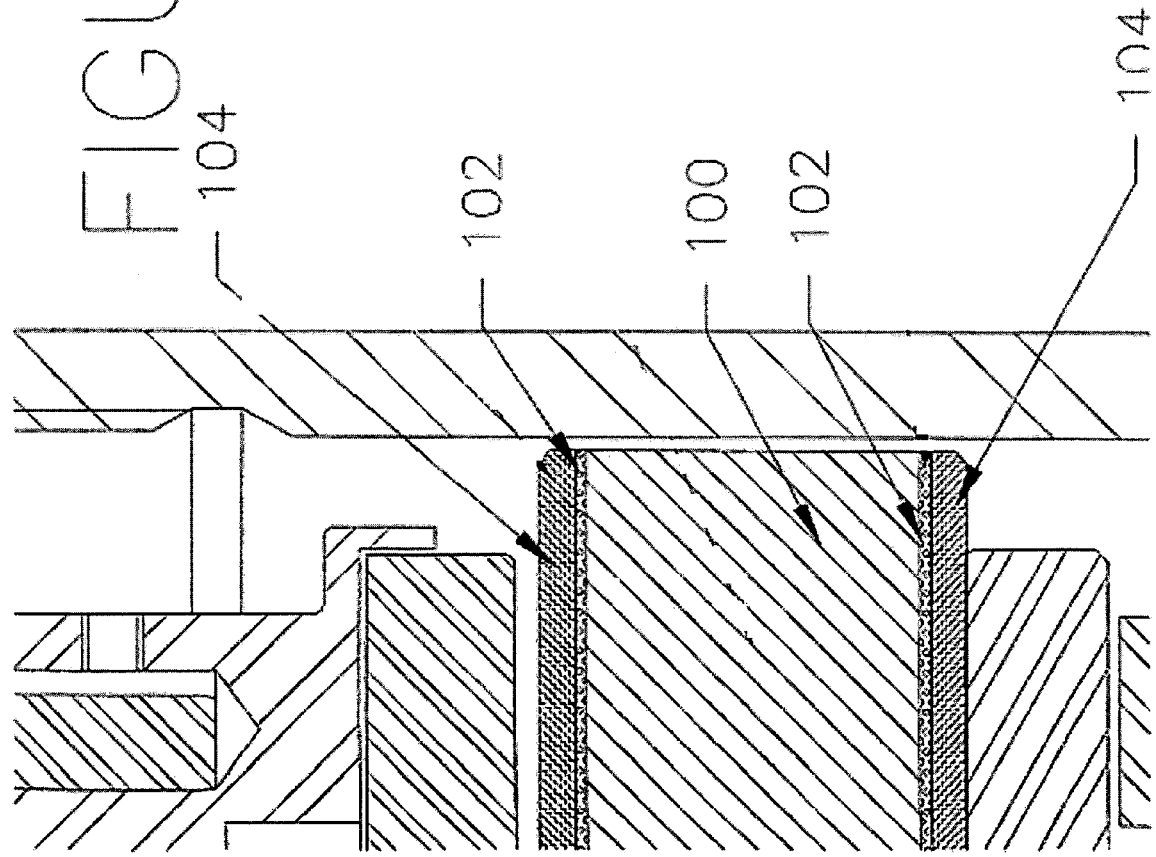
FIG. 1 is a partial sectional view of a runner according to an exemplary embodiment of the present invention.

In an embodiment of the present invention, FIG. 1 shows a bi-directional runner 100 having a bronze layer 102 (e.g., sintered bronze layer) and a wear layer 104 (e.g., made of an engineered plastic such as polyimide). In this example, runner 100 is a keyed steel runner with copper electroplating. Although runner 100 is depicted as a bi-directional runner, it is also possible to construct a uni-directional runner having the bronze layer 102 and layer 104 only on one side. In prior art bearing/runner assemblies, engineered plastic coatings may be used on tilt pad thrust bearings, but the plastic has invariably been applied to the bearing pads. By applying the bronze layer 102 and layer 104 to the runner, many advantages may be achieved.

To achieve this construction, runner 100, which may be a core layer made of steel, for example, is plated with a copper alloy. Runner 100 then has the porous bronze layer 102 added, for example, in a sintering process. After bronze layer 102 is in place on runner 100, layer 104 may be added, for example, by an injection molding process. In this manner, the material of layer 104 (e.g., polyimide) may flow into the porous areas of bronze layer 102, thus creating a wear surface firmly anchored to runner 100. In addition to polyimide, layer 104 may be made of other materials having suitable PV (pressure-times-velocity) values, such as polysultone and polyphenylene sulfide. Materials with a high PV value can withstand higher loads and higher speeds those with a lower PV value. In addition to injection molding, layer 104 may be affixed to runner 100 by other means, such as mechanical fastening or adhesives.

Applying the bronze layer and the polyimide layer to the runner yields functional advantages similar to those achieved in prior art bearing/runner assemblies in which engineered plastic coatings are applied to the bearing pads. In particular, the plastic layer provides a wear surface so as to avoid damage to the pad during start-up. The wear surface allows the pad to withstand wear caused during start-up. Even with a relatively rigid support structure, the assembly can be designed to achieve hydrodynamic operation during steady state conditions, but the wear characteristics at start-up can cause a potential concern. By providing a wear surface, the bearing assembly operates in two modes. First, at initial start-up, the bearing assembly acts as a wear bearing, wherein the coated runner shaft rubs against the pad surface. After start-up, the bearing assembly operates hydrodynamically, and there is little or no contact between the shaft and bearing pad surface.

By affixing the wear layer 104 to runner 100 rather than the bearing pads, further significant advantages may be achieved. For example, coating a runner is cheaper than coating bearing pads. In addition, the bearing pads may be constructed of hardened steel, which in turn prolongs their lives. Thus, the more expensive component of the bearing/runner system is constructed with the longest life and the cheaper item of the two is constructed as a replaceable wear item. Also, the runner is a much simpler component (e.g., a disc), thus allowing for fairly simple retrofitting to existing systems. Normally, runners are manufactured of heat-treated and often expensive materials. By using such a polymer coating, the runner itself may be manufactured of less expensive, and more easily machined mild steel.

Another advantage of the present invention is that the steel substrate may conduct heat away from the polymer (considered an insulator) better than a conventional polymer-coated bearing pad, due to the greater surface area of runner 1100 in comparison with the surface area of the bearing pad(s). Also, by coating runner 100, there is more polymer surface area to wear than if the pads themselves are coated. This may extend the bearing/runner life when mixed lubrication occurs.

Figure 2:
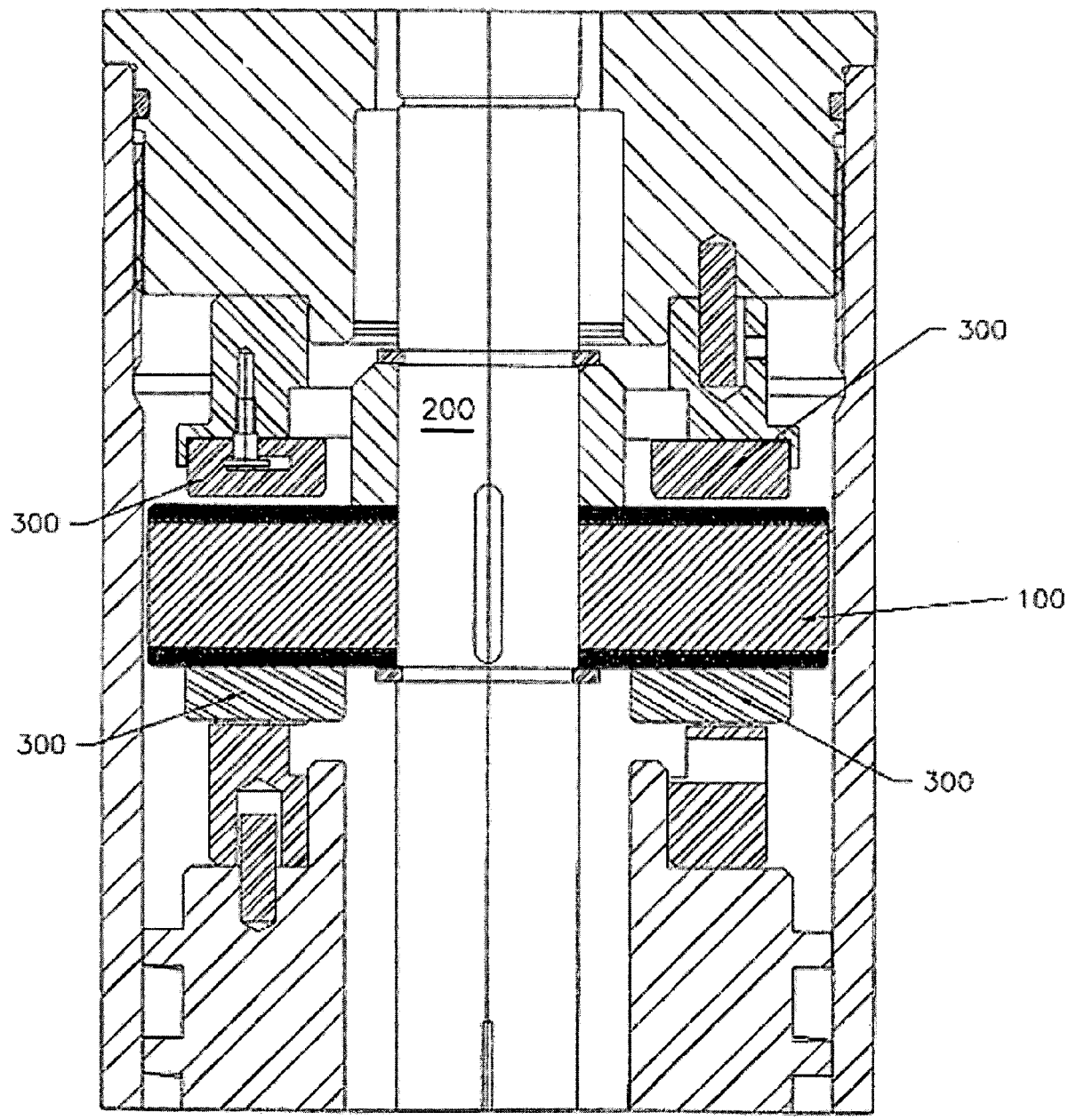
FIG. 2 is a sectional view of the runner of FIG. 1 in combination with a shaft and bearing assembly.

FIG. 2 depicts runner 100 in combination with bearing pads 300 and a shaft 200, according to an embodiment of the present invention having bi-directional up and down thrust. In this example, runner 100 is a keyed steel runner with copper electroplating.

Figure 3:
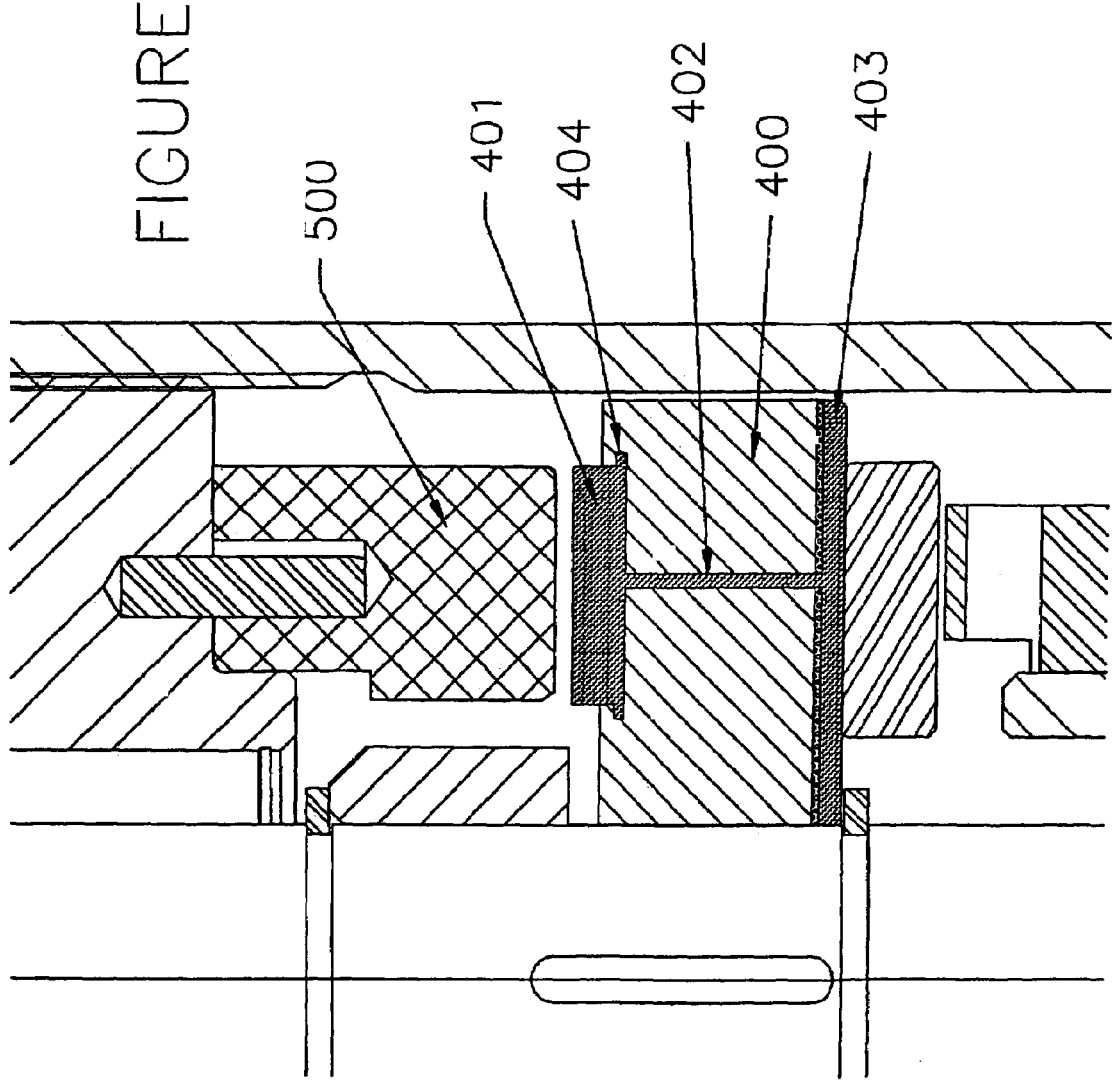
FIG. 3 is a partial sectional view of a runner with hydrodynamic bearing pads on one side, according to an embodiment of the present invention.
Figure 4:
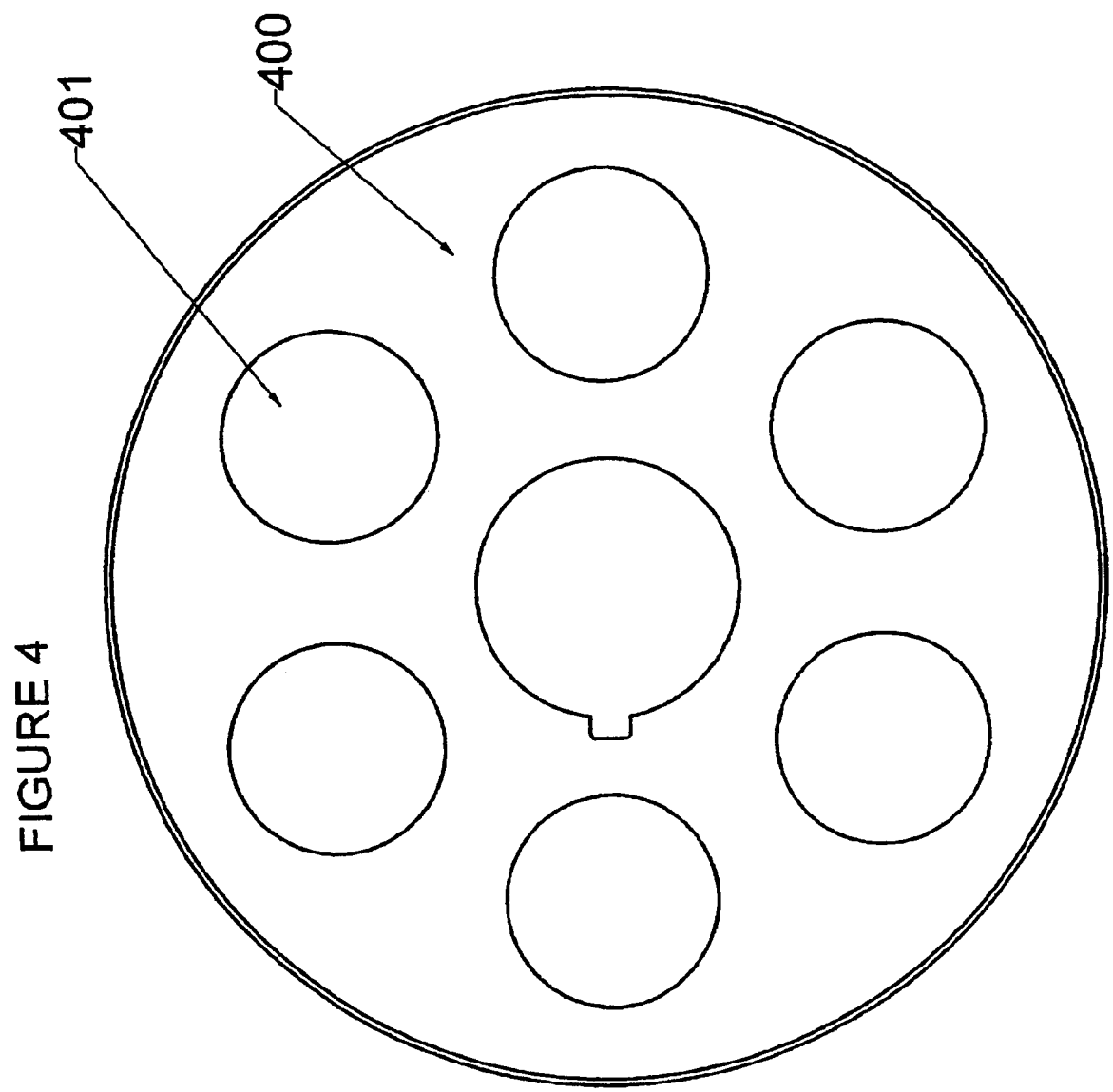
FIG. 4 is a plan view of the runner of FIG. 3 showing the bearing pads on the runner face.
Figure 5:
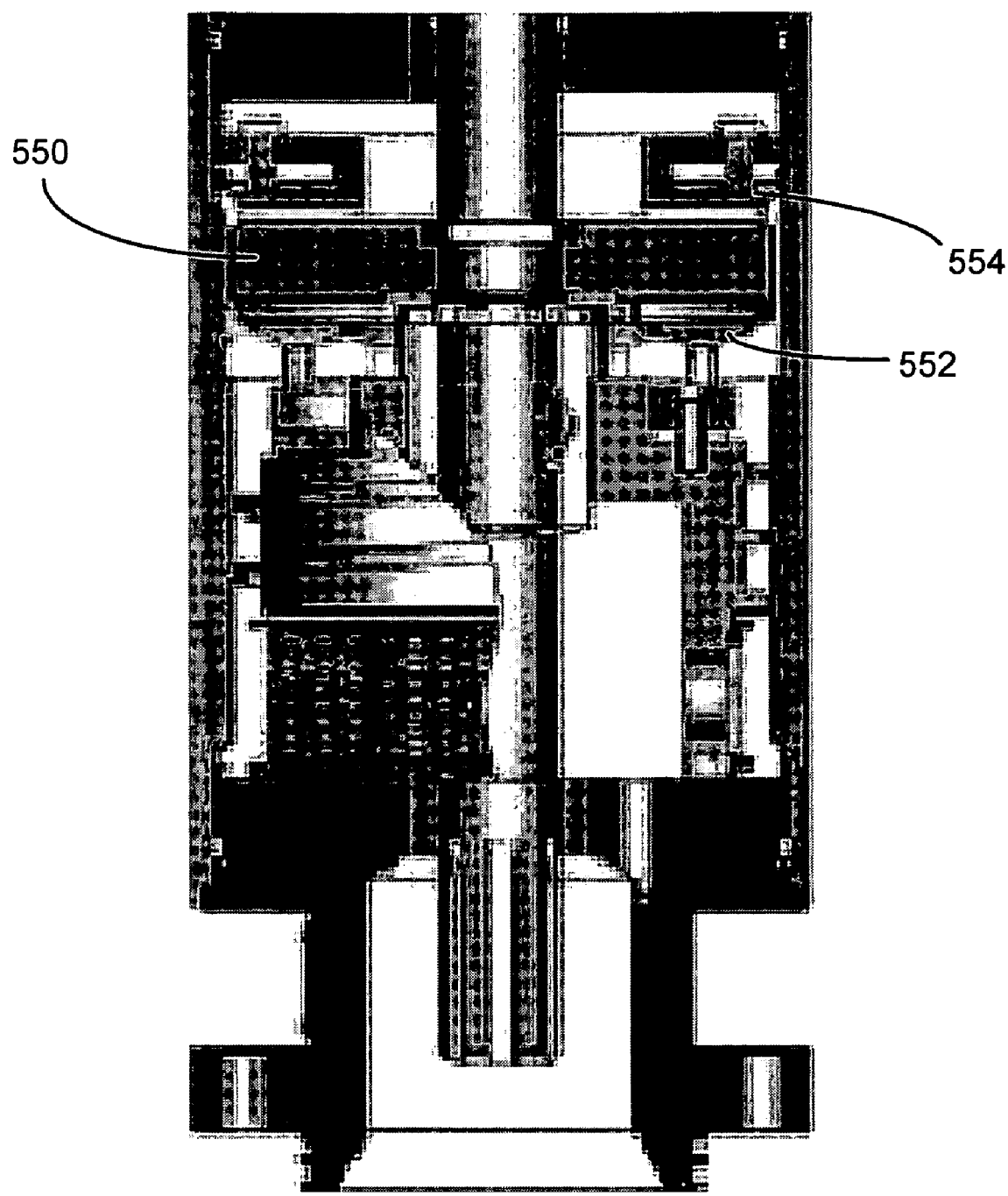
FIG. 5 is a sectional view of a seal section portion of a prior art deep well submersible pumping system.

FIG. 3 shows a runner 400 on which bearing pads 401 are molded on one side of the runner 400, according to an embodiment of the present invention. Holes or passageways 402 connect the pads 401 to the runner surface 403 so that the plastic can be injection molded in one operation. The holes 402, as well as undercuts 404, provide mechanical locks to hold the plastic of pads 401 and surface 403 in position. Optionally, instead of holes or undercuts, simple recesses or cavities could be provided in the surface of runner 400 into which plastic could be molded to form the pads 401. The bearing 500 is shown as a simple plate. FIG. 4 shows the runner 400 and bearing pads 401 in plan view.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A electrical submersible pump runner for use in a pad-type hydrodynamic bearing/runner assembly, the runner comprising:
a core layer;
a wear layer affixed to the core layer, wherein the wear layer is a first polymer layer, and
wherein the runner further comprises a second polymer layer affixed to the core layer on a side of the runner opposite the first polymer layer, and
wherein the core layer defines a passageway through which the first polymer layer and the second polymer layer are connected.

2. The runner of claim 1, further comprising at least one porous bronze layer affixed to the core layer, wherein the wear layer is affixed to the core layer by being affixed to the at least one porous bronze layer.

3. The runner of claim 1, further comprising first and second porous bronze layers affixed to opposite sides of the core layer to which respective ones of the first and second polymer layers are affixed.

4. The runner of claim 1, wherein the core layer comprises mild steel.

5. The runner of claim 1, wherein the core layer comprises copper electroplating.

6. The runner of claim 1, wherein the wear layer comprises polyimide.

7. The runner of claim 1, wherein the core layer defines a recess in which the wear layer is disposed.

8. The runner of claim 7, wherein the recess comprises an undercut.

9. The runner of claim 7, wherein the wear layer protrudes from the recess above the core layer.

10. The runner of claim 1, wherein the core layer defines a recess in which the first polymer layer is disposed.

11. The runner of claim 10, wherein the recess comprises an undercut.

12. The runner of claim 1, further comprising a porous bronze layer affixed to the core layer on the side of the runner opposite the first polymer layer, wherein the second polymer layer is affixed to the core layer by being affixed to the porous bronze layer.

13. A runner for use in a pad-type hydrodynamic bearing/runner assembly, the runner comprising:
a core layer; and
a polymer layer affixed to the core layer,
wherein the polymer layer forms a plurality of spaced bearing pads to provide a bearing that rotates with the runner.

14. The runner of claim 13, wherein the core layer defines recesses into which the polymer layer is molded.

15. The runner of claim 14, wherein the recesses comprise undercuts.

16. A bearing and runner assembly for use in a submersible pump system comprising:
a bearing comprising at least one bearing pad; and
a runner comprising a polymer coating affixed to a first side of the runner and individual bearing pads on a side of the runner opposite the first side.

17. The assembly of claim 16, wherein the runner defines passageways through which the polymer coating is connected to the individual bearing pads.

18. The assembly of claim 16, wherein the runner defines recesses in which the individual bearing pads are disposed, and wherein the recesses comprise undercuts.

19. The assembly of claim 16, wherein the runner further comprises a porous bronze layer to which the polymer coating is affixed.

20. The assembly of claim 16, wherein the bearing comprises uncoated hardened steel.

21. A submersible pump system comprising:
a multi-stage centrifugal pump; and a motor coupled to the multi-stage centrifugal pump, the motor comprising:
a shaft coupled to the multi-stage centrifugal pump,
a rotor having a thrust bearing, and
a first runner affixed to the shaft, the runner comprising a first core layer and a first wear layer affixed to the first core layer, wherein the first wear layer faces the thrust bearing;
further comprising a rotary gas separator and a seal section, wherein the shaft extends through the seal section, and
wherein the seal section comprises:
an up-thrust plate,
a down-thrust bearing, and
a second runner affixed to the shaft and disposed between the up-thrust plate and the down-thrust bearing, wherein the second runner comprises:
a second core layer,
a second wear layer affixed to a first side of the second runner facing the up-thrust plate, and
a third wear layer affixed to a second side of the second runner facing the down-thrust bearing.

22. The system of claim 21, wherein the second runner defines recesses in which the second wear layer is disposed.

23. The system of claim 21, wherein the second layer comprises individual bearing pads.

24. The system of claim 21, wherein the second runner defines a passageway through which the second wear layer is connected to the third wear layer.

25. A submersible pump system comprising:
a multi-stage centrifugal pump; and
a motor coupled to the multi-stage centrifugal pump, the motor comprising:
a shaft coupled to the multi-stage centrifugal pump,
a rotor having a thrust bearing, and
a first runner affixed to the shaft, the runner comprising a first core layer and a first wear layer affixed to the first core layer, wherein the first wear layer faces the thrust bearing; and
wherein the first core layer comprises mild steel, the first wear layer comprises a polymer, and the thrust bearing comprises uncoated hardened steel.

26. A method for overhauling a submersible pump system having a runner removably attached to a shaft, the method comprising:
removing the runner from the shaft;
removing a surface layer of the runner to expose a core substrate;
applying a wear layer to the core substrate; and reattaching the runner to the shaft.

27. The method of claim 26, wherein the surface layer comprises a worn polymer coating.

28. The method of claim 26, wherein the wear layer comprises an engineered plastic.

29. The method of claim 26, wherein applying a wear layer to the core substrate comprises:
applying a porous bronze layer to the core substrate; and
applying a polymer layer to the porous bronze layer.

30. The method of claim 29, wherein applying the porous bronze layer comprises sintering the porous bronze layer.

31. The method of claim 29, wherein applying the polymer layer comprises injection molding the polymer layer into porous areas of the porous bronze layer.

32. The method of claim 29, wherein applying the polymer layer comprises injection molding the polymer layer into recesses of the runner to form individual bearing pads.

33. The method of claim 29, wherein applying the polymer layer comprises injection molding the polymer layer on opposite sides of the runner connected by passageways through the runner.

* * * * *